United States Patent
Lee

(10) Patent No.: US 9,233,815 B2
(45) Date of Patent: Jan. 12, 2016

(54) METHOD OF CONTROLLING ELEVATOR MOTOR ACCORDING TO POSITIONAL VALUE AND ROTATIONAL SPEED

(71) Applicant: LSIS CO., LTD, Anyang-si, Gyeonggi-do (KR)

(72) Inventor: Eun Woo Lee, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 615 days.

(21) Appl. No.: 13/684,122

(22) Filed: Nov. 21, 2012

(65) Prior Publication Data

US 2013/0146397 A1    Jun. 13, 2013

(30) Foreign Application Priority Data

Nov. 24, 2011  (KR) .......................... 10-2011-0123880

(51) Int. Cl.
*B66B 1/28* (2006.01)
*B66B 1/30* (2006.01)
*H02P 23/00* (2006.01)

(52) U.S. Cl.
CPC . *B66B 1/30* (2013.01); *B66B 1/304* (2013.01); *H02P 23/0063* (2013.01)

(58) Field of Classification Search
CPC ........ B66B 1/30; B66B 1/304; H02P 23/0063
USPC ......... 187/247, 277, 293, 296, 297, 391, 393, 187/394; 318/599, 606, 609, 610, 432, 318/799–815
See application file for complete search history.

(56) References Cited

U.S. PATENT DOCUMENTS

| | | | | |
|---|---|---|---|---|
| 4,625,834 A | * | 12/1986 | Tanahashi | 187/296 |
| 5,076,399 A | * | 12/1991 | Horbruegger et al. | 187/293 |
| 5,131,507 A | * | 7/1992 | Watanabe | 187/285 |
| 5,157,228 A | * | 10/1992 | Ackermann et al. | 187/247 |
| 5,250,765 A | * | 10/1993 | Mizuno et al. | 187/316 |
| 5,325,460 A | * | 6/1994 | Yamada et al. | 388/811 |
| 5,407,030 A | * | 4/1995 | Burton et al. | 187/392 |
| 5,780,786 A | * | 7/1998 | Miyanishi | 187/293 |
| 5,828,014 A | * | 10/1998 | Goto et al. | 187/292 |
| 5,959,266 A | * | 9/1999 | Uchiumi | 187/292 |

(Continued)

FOREIGN PATENT DOCUMENTS

| | | |
|---|---|---|
| CN | 1172762 | 2/1998 |
| CN | 17538424 | 3/2006 |

(Continued)

OTHER PUBLICATIONS

The State Intellectual Property Office of the People's Republic of China Application Serial No. 201210483066.1 Office Action dated Apr. 24, 2014, 8 pages.

(Continued)

*Primary Examiner* — Anthony Salata
(74) *Attorney, Agent, or Firm* — Lee, Hong, Degerman, Kang & Waimey

(57) ABSTRACT

In one embodiment, an elevator controlling method includes calculating the positional value of an elevator driving motor the every first cycle; generating a control signal every third cycle to control the motor based on the calculated positional value and the rotational speed of the motor calculated every second cycle; and controlling the driving power source of the motor based on the generated control signal.

9 Claims, 8 Drawing Sheets

(56) References Cited

U.S. PATENT DOCUMENTS

| | | | |
|---|---|---|---|
| 6,700,342 B2 * | 3/2004 | Hampo et al. | 318/432 |
| 7,577,545 B2 * | 8/2009 | Hu | 702/151 |
| 2005/0151500 A1 | 7/2005 | Akiyama | |

FOREIGN PATENT DOCUMENTS

| | | |
|---|---|---|
| CN | 101432214 | 5/2009 |
| EP | 0198249 | 10/1986 |
| JP | 01-271382 | 10/1989 |
| JP | 06092558 | 5/1994 |
| JP | 08-169652 | 7/1996 |
| JP | 11255441 | 9/1999 |
| JP | 2000197399 | 7/2000 |
| JP | 2002-044975 | 2/2002 |
| JP | 2003-216243 | 7/2003 |
| JP | 2004064833 | 2/2004 |
| JP | 2005-035796 | 2/2005 |
| JP | 2008-005629 | 1/2008 |
| JP | 2009-268285 | 11/2009 |
| JP | 2010-105763 | 5/2010 |
| JP | 2011-172317 | 9/2011 |

OTHER PUBLICATIONS

Japan Patent Office Application Serial No. 2012-256415, Notice of Allowance dated Jan. 7, 2014, 3 pages.

European Patent Office Application Serial No. 12193559.7, Search Report dated Mar. 18, 2014, 8 pages.

Korean Intellectual Property Office Application Serial No. 10-2011-0123880, Office Action dated Sep. 14, 2015, 8 pages.

* cited by examiner

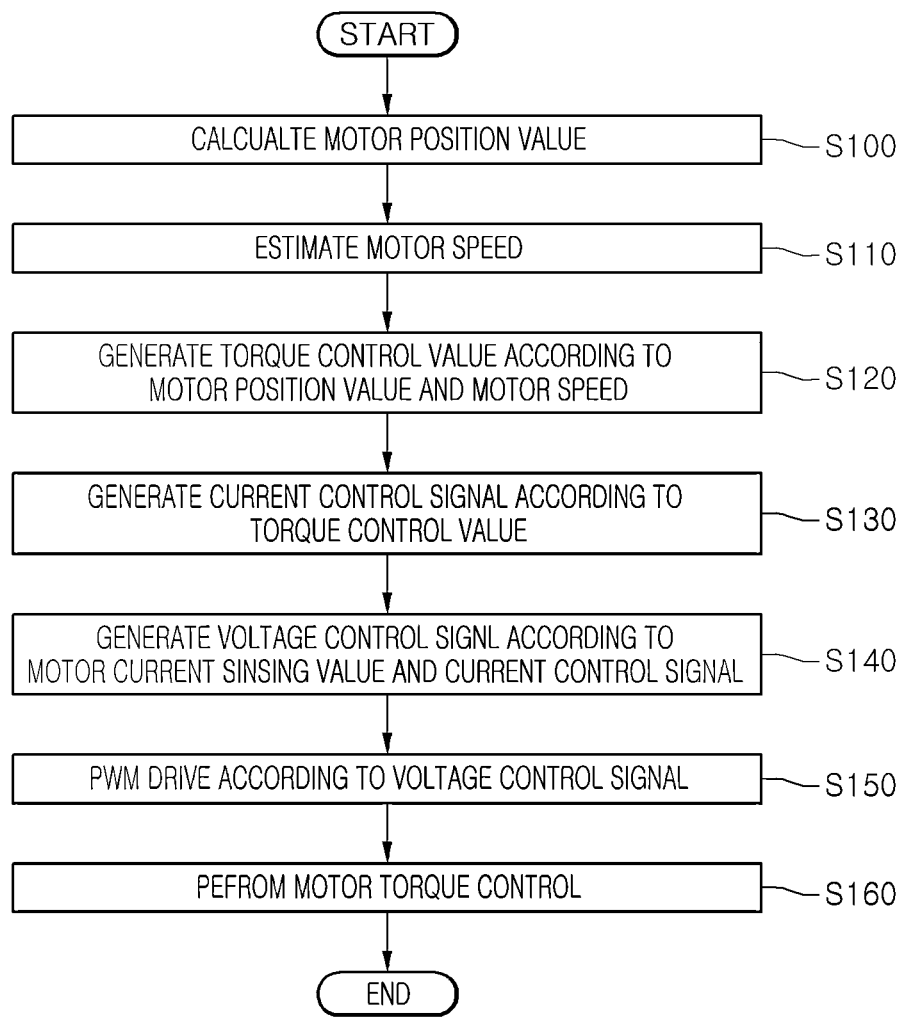

METHOD OF CONTROLLING ELEVATOR MOTOR ACCORDING TO POSITIONAL VALUE AND ROTATIONAL SPEED

CROSS-REFERENCE TO RELATED APPLICATIONS

Pursuant to 35 U.S.C. §119(a), this application claims the benefit of earlier filing date and right of priority to Korean Patent Application No. 10-2011-0123880, filed on Nov. 24, 2011, the contents of which are hereby incorporated by reference herein in its entirety.

BACKGROUND

The embodiment relates to an elevator controlling method and device, and an elevator using the same. More particularly, the embodiment relates to an elevator controlling method and device, and an elevator using the same that may enhance control performance.

In general, an elevator is used to make people get in and move them up and down in a high-rise building or is used to load and transport cargo. The elevator goes up and down by the driving of a hoist, a kind of a driving device, in an elevator shaft installed in the high-rise building. In addition, an elevator car that has a given space where people may get in or cargo may be loaded is connected and installed to the hoist.

In addition, a 3-phase industrial inverter that generally replaces a DC motor and is used for an elevator driving motor may torque-control an AC motor through vector control.

The brake of an elevator may be controlled by the control of an inverter. When the brake of such an elevator opens, a car shakes, which is called rollback. A load-cell that is a sensor device for measuring the weight is generally used to decrease rollback, and the rollback of an elevator car may decrease using the weight sensing of such a load-cell.

However, a method is being recently developed, which may decrease rollback without load-cell by loading a control algorithm in an inverter itself used for the speed control of an elevator, to increase the reliability matter and the efficiency in speed control of a load-cell sensor.

To decrease rollback, it is important to quickly follow a torque corresponding to the size of a load, which is called load compensation.

FIG. 1 is a diagram for describing an example of a speed controlling device according to the related art to decrease such load compensation.

Referring to FIG. 1, an elevator controlling device, such as P-PI mechanics according to the related art may include a position controlling unit 10, a speed controller 11, a motor speed measuring unit 12, and an inverter 14.

The position controlling unit 10 acquires a position-controlled value θ for controlling a position and an actual positional value θ*, finds the difference between them, multiplies the difference value by a proportional gain value KPP, and outputs a speed-controlled value.

In addition, the speed controller 11 applies proportional gain KP and integral gain KI to the difference between the speed-controlled value and the speed value received from the motor speed measuring unit 12, adds the value, and outputs it as a torque-controlled value T*.

The inverter 14 receives the torque-controlled value a load T1 applied to a motor due to the weight of a car, a rope, passengers, etc. at the elevator, and controls the speed of an elevator. In addition, if an actual speed ω and an actual position θ are measured from the motor controlled by the inverter 14, they may be feedback as the input of the position controlling unit 10 and the speed controller 11.

The inverter 14 makes an actual torque through vector control according to a torque-controlled value and controls speed. The vector control may be performed on current that has been divided into magnetic flux controlling components and torque controlling components. J means an inertia value, S means a Raplace operator, and 1/S means integral.

The transfer function of the elevator controlling device according to the related art is represented by the following Equation 1.

$$\theta = \frac{s}{Js^3 + K_{PS}s^2 + (K_I + K_{PP}K_P)s + K_{PP}K_I} T_l \quad \langle \text{Equation 1} \rangle$$

If designing a pole in case of the elevator controlling device according to the related art, there is a problem that it is difficult to freely arrange the pole. The coefficients of a transfer function are not independent from one another and include the product and sum of gains. Thus, if a gain changes, then two or more coefficients change. As a result, it is not possible to freely design a pole.

In addition, in case of triple root, there is a problem that it is not possible to arrange a pole itself. The reason is that if a discriminant is applied under the assumption of triple root, there is no root value that makes both the discriminant of the cubic equation and the discriminant of the quadratic equation resulting from differentiation of this on the right term in Equation 1 zeros.

SUMMARY

An embodiment provides an elevator controlling method that may enhance control efficiency.

Embodiments also provide a control device and a control method that may decrease a rollback phenomenon at an elevator without a load-cell.

Embodiments also provide an elevator controlling device and method, and an elevator including the same that may effectively decrease a rollback phenomenon through a state estimating unit.

In one embodiment, an elevator controlling method includes calculating the positional value of an elevator driving motor the every first cycle; generating a control signal every third cycle to control the motor based on the calculated positional value and the rotational speed of the motor calculated every second cycle; and controlling the driving power source of the motor based on the generated control signal.

In addition, the generating of the control signal may further include estimating the rotational speed of the motor by the control signal every second cycle according to the calculated positional value.

In addition, the generating of the control signal may include taking a proportional and integral action on the difference between the position-controlled value and the calculated positional value of the motor; calculating a torque-controlled value based on subtraction of a value obtained by multiplying the rotational speed by a first constant and a value obtained by multiplying the positional value by a second constant, from a value obtained through the proportional and integral action; and generating a torque-controlled signal according to the calculated torque-controlled value.

In addition, the generating of the torque-controlled signal may receive and calculate the speed of the motor measured from a motor speed measuring device every second cycle.

In addition, the generating of the torque-controlled signal may generate a current-controlled value according to the torque-controlled value, perform vector control based on the generated current-controlled value and the current sensing value of the motor to generate a voltage-controlled value, and generate the torque-controlled signal based on the generated voltage-controlled value.

In another embodiment, an elevator controlling device includes a position storage unit that stores the positional value of an elevator driving motor; a control signal processing unit that receives the positional value of the motor from the position storage unit every first cycle, calculates the speed of the motor every second cycle, and generates a control signal for controlling the motor every third cycle; and a motor driving unit that controls the driving of the motor based on the control signal.

In addition, the elevator may include a motor; a motor position measuring unit that calculates and transmits the positional value of the motor to the elevator controlling device; a position storage unit that stores the positional value of the motor; a state feedback position controlling unit that receives the positional value of the motor from the position storage unit every first cycle, receives the speed of the motor, and outputs a torque-controlled value to control the motor; a state estimating unit that estimates the speed of the motor based on the torque-controlled value and the positional value every second cycle and transmits the result to the state feedback position controlling unit; a vector controlling unit that generates a current-controlled value based on the torque-controlled value and outputs a voltage-controlled value according to the current-controlled value and the driving current of the motor; and a motor driving unit that controls the driving power source of the motor according to the voltage-controlled value.

In addition, the state feedback position controlling unit may take a proportional and integral action on the difference between the position-controlled value and calculated positional value of the motor and may output, as a torque-controlled value, subtraction of a value obtained by multiplying the rotational speed by a first constant and a value obtained by multiplying the positional value by a second constant, from a value obtained through the proportional and integral action.

In addition, the control signal processing unit may include a state feedback position controlling unit that outputs the torque-controlled value of the motor according to the calculated positional value and the rotational speed of the motor, and the control signal processing unit may output a control signal to the torque of the motor based on the torque-controlled value.

In addition, the state feedback position controlling unit may take a proportional and integral action on the difference between the position-controlled value and calculated positional value of the motor and may output, as a torque-controlled value, subtraction of a value obtained by multiplying the rotational speed by a first constant and a value obtained by multiplying the positional value by a second constant, from a value obtained through the proportional and integral action.

In addition, the elevator controlling device may include a current sensor that senses the driving current of the motor; and a vector controlling unit that outputs a voltage-controlled signal based on the current-controlled value and driving current of the motor received from the current sensor, and the state feedback position controlling unit may generate and transmit a current-controlled value according to the torque-controlled value to the vector controlling unit.

In addition, the control signal processing unit may include a speed estimating unit that estimates the rotational speed of the motor according to the control signal and calculated positional value every second cycle.

In addition, the control signal processing unit may acquire the speed of the motor measured from a motor speed measuring device.

BRIEF DESCRIPTION OF THE DRAWINGS

FIG. 8 is a flow chart illustrating a speed controlling method of an elevator according to an embodiment.

DETAILED DESCRIPTION OF THE EMBODIMENTS

The terms or words used in the specification and claims should not be narrowly construed as typical or denotative meanings. Rather, they should be construed as meanings or concepts matching the technical spirit of an embodiment based on the principle that inventors may properly define the concepts of the terms to describe their inventions in the best way.

Thus, since embodiments described in the specification and configurations illustrated in figures are just most preferable examples and do not fully represent the technical spirit of embodiments, it should be understood that there may be various equivalents and variations that replace embodiments at the time of filing this application.

Figure 1:
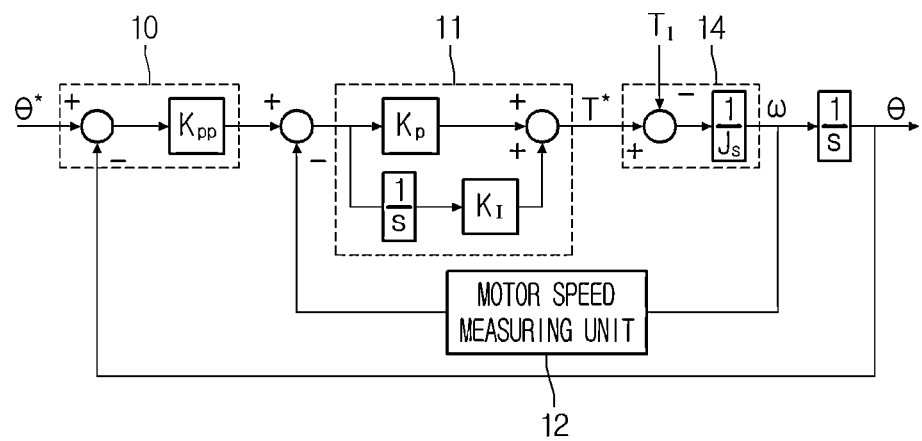
FIG. 1 is a diagram describing an example of a speed controlling device according to the related art to decrease load compensation.
Figure 2:
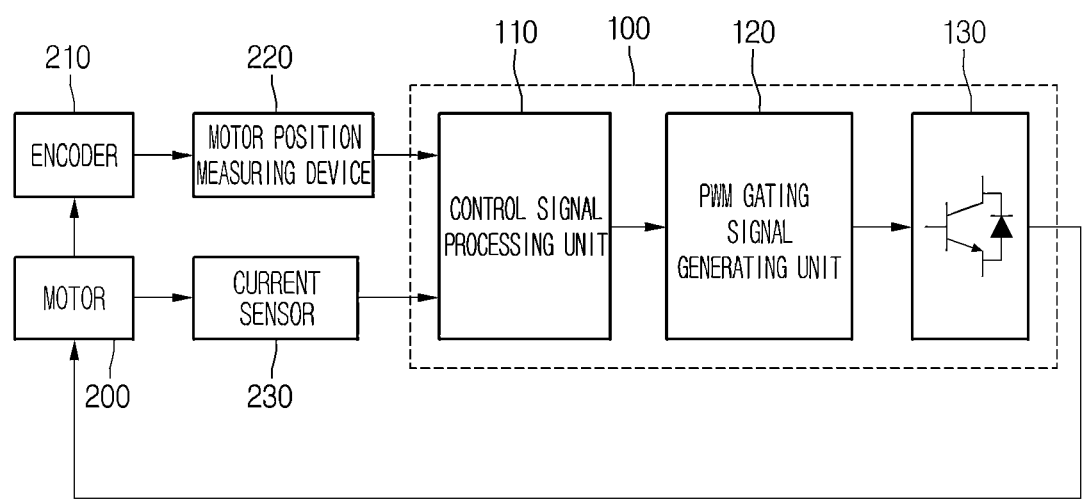
FIG. 2 is a diagram schematically illustrating the overall elevator system including the speed controlling device of an elevator according to an embodiment.

FIG. 2 is a diagram schematically illustrating a power transforming device according to an embodiment.

Referring to FIG. 2, an elevator system including a speed controlling device 100 according to an embodiment includes an elevator driving motor 200, a control device 100 for controlling the motor 200, an encoder 210 for measuring the rotational state of the motor, and a motor position measuring device 200 for measuring a motor position (an rotational angle) from the pulse output of the encoder 210.

The control device 100 includes a control signal processing unit 110, a PWM gating signal generating unit 120, and a PWM inverter unit 130.

The control signal processing unit 110 may generate a control signal for decreasing the rollback phenomenon of an elevator without a load-cell. The control signal processing unit 110 performs signal processing for controlling the motor using state feedback position control as will be described below and using state estimating.

The PWM gating signal generating unit 120 may input a driving signal to the motor according to the signal processed in the control signal processing unit 110.

The PWM inverter unit 130 may be switched according to the driving signal that has been generated from the PWM gating signal generating unit 120.

These PWM gating signal generating unit 120 and PWM inverter unit 130 may serve as a motoring driving unit that controls the driving of the motor according to a voltage-controlled signal.

Meanwhile, the encoder 210 may be connected to the motor 200, output pulses according to the rotation of the motor 200, and transmit them to the motor position measuring device 220.

The motor position measuring device 220 measures a motor position value or rotational angle θ, and transmits it to the control signal processing unit 110. At this point, the motor position measuring device 220 calculates the positional value of the motor, rotational angle based on the pulse signals received from the encoder 210. The motor position measuring device 220 may use an M/T scheme, for example. The M/T scheme is a scheme that uses a certain time and a pulse signal measured from the encoder 210 according to the driving of the motor 200. The M/T scheme enables the rotational speed and rotational angle of the motor 200 to be measured as digital values. Thus, the motor position measuring device 220 may measure the current position (rotational angle) by counting pulses for a certain time. In addition, such a motor position measuring scheme may include methods that measure the number of pulses or the interval between pulses. It should be noted that the M/T scheme capable of being used in the embodiment is a scheme that supplements drawbacks of the schemes of measuring the number of pulses and the interval of pulses by combining them.

Meanwhile, the current sensor 230 senses current values currently flowing in the motor 200 for the current vector control of the control signal processing unit 110 as will be described below, and transmits them to the control signal processing unit 110.

Figure 3:
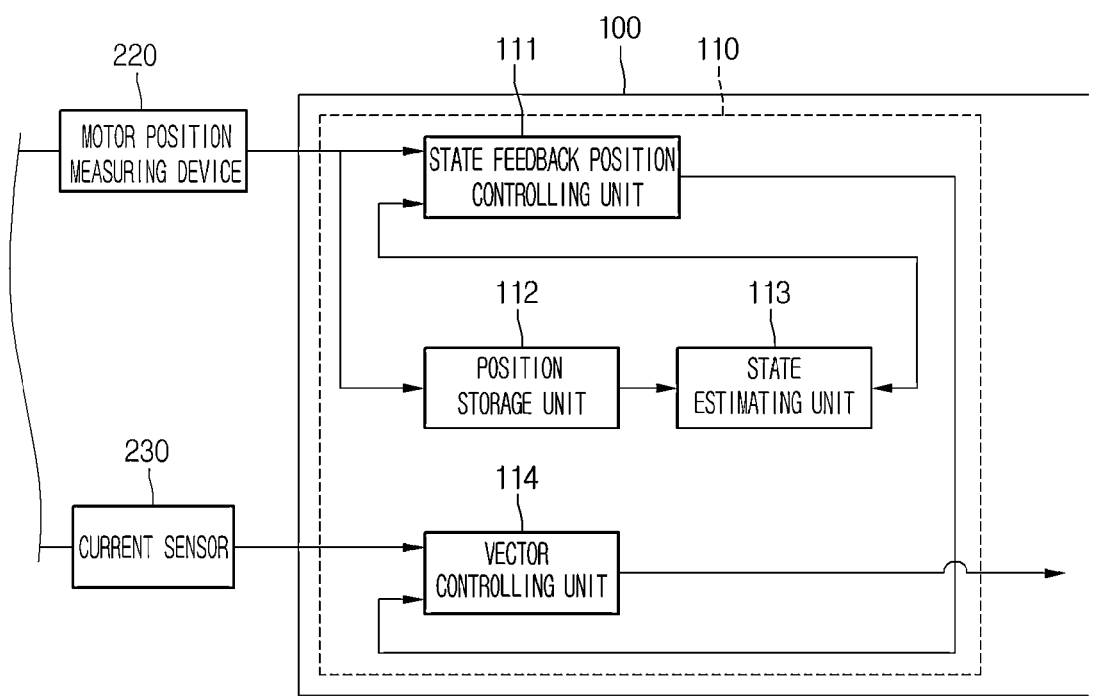
FIG. 3 is a diagram illustrating a configuration of a control signal processing unit 110 of an elevator controlling device 100 according to an embodiment.

FIG. 3 is an exemplary diagram illustrating more in detail a configuration of the control signal processing unit 110 of an elevator controlling device 100 according to an embodiment.

Referring to FIG. 3, the control signal processing unit 110 of the elevator controlling device 100 may include a state feedback position controlling unit 111 that generates a control signal for controlling the torque of a motor according to the current position of the motor and the estimated motor speed, a position storage unit 112 that stores the current position of the motor and updates the motor position on a certain cycle, a state estimating unit 113 that estimates the speed of the motor according to the stored motor position and a torque-controlled value received from the state feedback position controlling unit 111, and a vector controlling unit 114 that receives the current and current-controlled value sensed and outputs a voltage-controlled signal.

The state feedback position controlling unit 111 receives the positional value of the motor from the motor position measuring device 220, receives the estimated speed of the motor from the state estimating unit 113, and outputs the controlled current value of the motor for decreasing the rollback phenomenon of an elevator.

The state estimating unit 113 estimates the speed of the motor based on the positional value of the motor stored in the position storage unit 112 and the torque-controlled value received from the state feedback position controlling unit 111.

The vector controlling unit 114 receives the current driving current measurement of the motor from the current sensor 230, eventually controls an elevator motor voltage based on the driving current measurement and the controlled current value received from the state feedback position controlling unit 111, and outputs a voltage-controlled signal as a signal for decreasing a rollback phenomenon.

The vector controlling unit 114 may operate in response to an interruption of a first cycle. In addition, the state estimating unit 113 may regularly operate in response to an interruption of a second cycle. The state feedback position controlling unit 111 may operate in response to an interruption of a third cycle. At this point, the state estimating unit 113 must perform quick calculation on the change in position. Thus, the interruption cycle of the state estimating unit 113 may be designed to be shorter than those of the other interruptions. The state feedback position controlling unit 111 may be designed to be performed at 1 ms interruption to be not frequently performed. However, since a relative effect in case of designing each cycle may be different, the embodiment may differently set the cycles of interruptions according to a method of designing the inverter of an elevator.

In addition, the second cycle may be set to be the same to the first cycle and it is possible that a design is made to be able to include the cycles one another.

Figure 4:
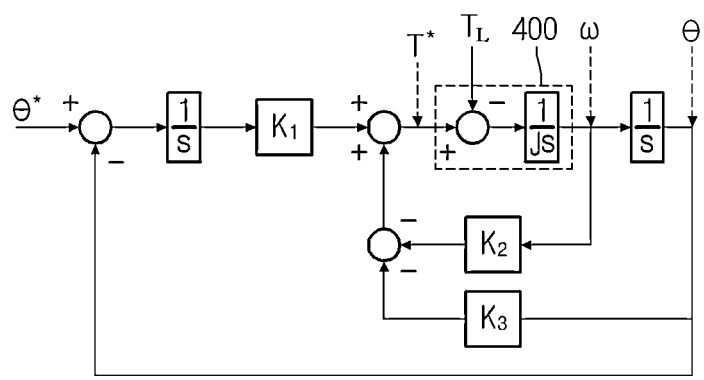
FIG. 4 is a control diagram conceptually illustrating a configuration of a state feedback position controlling unit 111 according to an embodiment.

FIG. 4 is a control diagram illustrating a configuration of the state feedback position controlling unit 111 according to an embodiment.

Referring to FIG. 4, the state feedback position controlling unit according to an embodiment is described.

The state feedback position controlling unit 111 may configured as illustrated in FIG. 4. Input θ* represents a position to be controlled. For example, a positional value to be controlled at a general elevator becomes zero to decrease a rollback phenomenon. In other words, a user may set the final position of the motor to be controlled according to the embodiment.

In addition, the state feedback position controlling unit 111 may calculate the difference between the position-controlled value θ* input in this way and the current positional value θ of the motor and take a proportional and integral action according to a proportional constant K1. If a value obtained by multiplying the speed ω of the motor by K2 and a value obtained by multiplying the current position θ of the motor by K3 is subtracted from the value obtained from the proportional and integral action according to K1, a torque-controlled value T* for control is generated. At this point, the state feedback position controlling unit 111 may generate a current-controlled value based on the value T* generated and transmit the result to the vector controlling unit 114.

At this point, the speed ω of the motor may be calculated through an integral action based on the current load TL and the torque-controlled value T* as in the reference numeral 400 in FIG. 4. Alternatively, a speed value observed from another device may also be input. Thus, ω may be a value that is input from the outside. In addition, ω may be a speed estimating value that has been output from the state estimating unit 113.

In addition, although the current positional value θ of the motor may be calculated through an integral action on a speed value, it may be calculated with a positional value measured from the encoder 210 and the motor position measuring device 220 as described above.

Meanwhile, if such a state feedback position controlling unit 111 is configured, a transfer function for the motor position (rotational angle) may be acquired as the following Equation 2.

$$\theta = \frac{K_1}{Js^3 + K_2s^2 + K_3s + K_1}\theta^* - \frac{s}{Js^3 + K_2s^2 + K_3s + K_1}T_l \quad \langle\text{Equation 2}\rangle$$

At this point, if the gain of the state feedback position controlling unit 111 is α, the gain equation of triple root may be K1=−J*α^3, K2=−3*J*α, and K3=3*J*α^2. J represents an inertia value, and S means a Raplace operator. The inertia value is determined by factors, such as an elevator car, passengers, and a rope. The gain α is a polar value and preferably has a negative value. In addition, a range capable of being set for each coefficient may vary depending on the configuration of a system.

As in Equation 2, if designing a transfer function on a load torque in the same configuration as in FIG. 4, K1, K2, and K3 may be freely designed. Thus, although a design is made to have tripe root, a problem does not occur.

Figure 5:
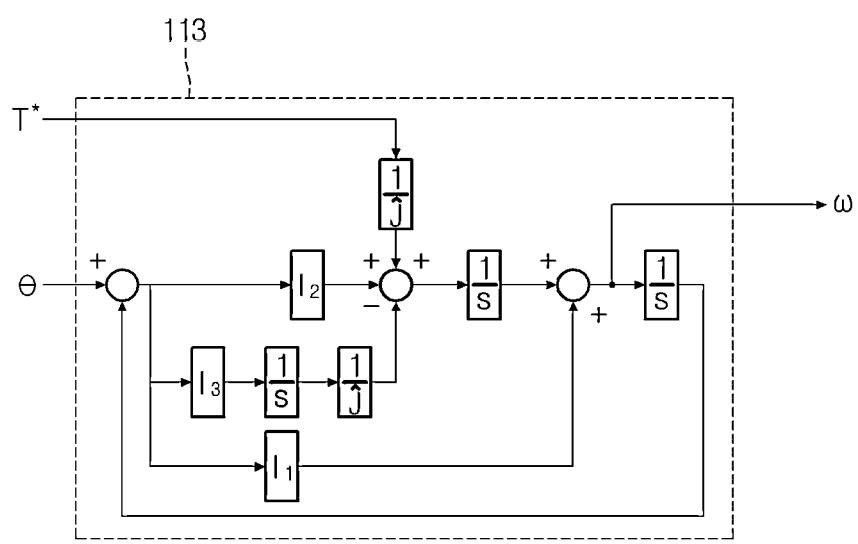
FIG. 5 is a control diagram illustrating an operation of a state estimating unit 113 of an elevator controlling device 100 according to an embodiment.

FIG. 5 is a control diagram illustrating the operation of the state estimating unit 113 of an elevator controlling device 100 according to an embodiment.

Referring to FIG. 5, the state estimating unit 113 receives a torque-controlled value T* and a motor position value θ as inputs, and outputs a speed estimating value ω based on this.

As such, the state estimating unit 113 may estimate the speed of the motor according to the torque-controlled value and the motor position value. This enables faster processing than a process of actually measuring and calculating speed to enable effective control on an elevator.

Meanwhile, in the control diagram of FIG. 5, it is possible that 11=−3*β, 12=3*β^2, 13=β^3*J. The value β is the gain of the state estimating unit 113, and J means an inertia value that is determined by factors, such as an elevator, passengers, and a rope. In order to obtain more effective result, the gain β of the state estimating unit 113 preferably uses a greater value than the gain α of the state feedback position controlling unit.

Figure 6:
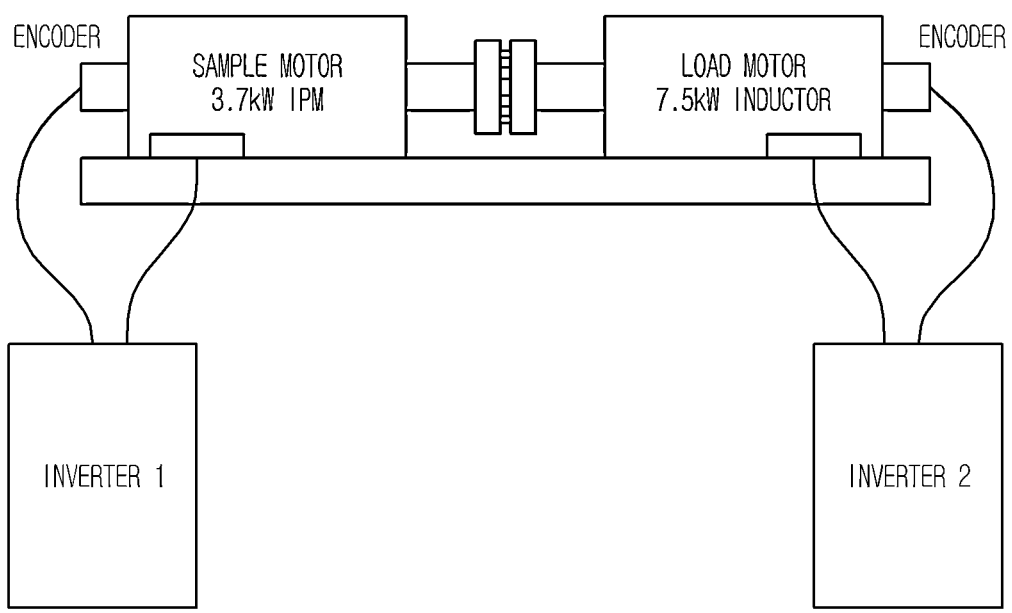
FIG. 6 is a diagram describing an experiment made using a sample motor including an elevator controlling device 100 according to an embodiment.

FIG. 6 is a diagram describing an experiment made using a sample motor including an elevator controlling device 100 according to an embodiment.

Looking into the configuration diagram of FIG. 6, the encoder of the sample motor may be a 2000 pulse sin/cos encoder. The encoder of the sample motor may output 2000 sin/cos signals per rotation.

The sin/cos signal is input to an inverter 1. The signal may be converted into 32768 A/B pulses using an RD converter used in a resolver. The pulsed converted may be applied to the position control. The overall inertia of a system is 0.084 kgms. In addition, the sample motor includes a brake and may be used for emulating the brake of an elevator.

Meanwhile, parameters for the sample motor are represented in the following Table 1.

TABLE 1

| Items | parameters |
|---|---|
| Rated Voltage | 220 V |
| Rated Current | 20.2 A |
| Ld | 1.11 mH |
| Rs | 0.059 Ohm |
| Pole | 8 |

Figure 7:
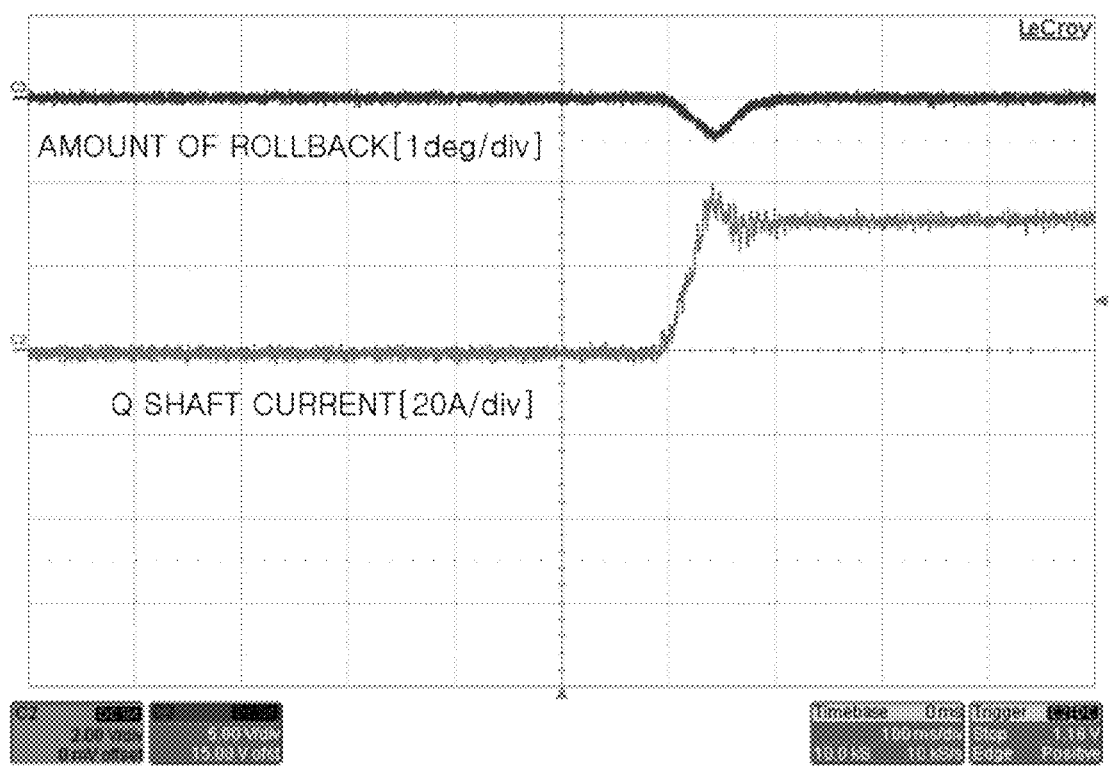
FIG. 7 is a graph illustrating a result of emulating and controlling an elevator using such a sample motor.

FIG. 7 is a graph illustrating a result of emulating and controlling an elevator using such a sample motor.

Referring to FIG. 7, the position control deviation of an elevator controlling device 100 may be recognized, which uses a state feedback position controlling unit 111 according to an embodiment.

It may be checked that the elevator controlling device 100 according to the embodiment may control an amount of rollback within 0.5 degree as illustrated in FIG. 7.

In addition, in this experiment, the state estimating unit 113 has been used as the speed feedback value of the state feedback position controlling unit 111. As a result, a control bandwidth may further increase using the state estimating unit 113. Meanwhile, the state feedback position controlling unit 111 has operated on an interruption cycle of 1 ms, and the state estimating unit 113 has been performed on a shorter PWM interruption cycle of 125 us.

FIG. 8 is a flow chart illustrating a speed controlling method of an elevator according to an embodiment.

Referring to FIG. 8, a motor position value is calculated from the encoder 210 connected to the motor 200, in step S100.

The state estimating unit 113 estimates the speed of the motor through processes described above, in step S110.

The state feedback position controlling unit 111 generates a torque-controlled value based on the estimated motor speed and the motor position value, in step S120.

The state feedback position controlling unit 111 generates a current-controlled signal according to the torque-controlled value, in step S130. The vector controlling unit 114 receives a motor current sensing value and generates a voltage-controlled signal according to the current-controlled signal, in step S140.

The motor driving units 120 and 130 including e.g. a PWM signal generator input a PWM signal to the motor 200 according to the voltage-controlled signal to input a driving power source, in step S150.

The motor 200 may perform torque control according to a driving power source, in step S160.

Although the invention has been described above based on exemplary embodiments, these are just examples and do not define the invention, and those skilled in the art may appreciate that various variations and applications not illustrated above may make within the scope falling within the essential feature of the invention. For example, each component particularly illustrated in embodiments may be varied. In addition, differences related to such variations and applications should be construed to be included in the scope of the invention that is defined in the accompanying claims.

What is claimed is:

1. An elevator controlling method, comprising:
   calculating the positional value of an elevator driving motor the every first cycle;
   generating a control signal every third cycle to control the motor based on the calculated positional value and the rotational speed of the motor calculated every second cycle; and
   controlling the driving power source of the motor based on the generated control signal,
   wherein the generating of the control signal comprises:
   taking a proportional and integral action on the difference between the position-controlled value and the calculated positional value of the motor;
   calculating a torque-controlled value based on subtraction of a value obtained by multiplying the rotational speed by a first constant and a value obtained by multiplying the positional value by a second constant, from a value obtained through the proportional and integral action; and
   generating a torque-controlled signal according to the calculated torque-controlled value.

2. The method according to claim 1, wherein the generating of the control signal further comprises estimating the rotational speed of the motor by the control signal every second cycle according to the calculated positional value.

3. The method according to claim 1, wherein the generating of the torque-controlled signal receives and calculates the speed of the motor measured from a motor speed measuring device every second cycle.

4. The method according to claim 1, wherein the generating of the torque-controlled signal generates a current-controlled value according to the torque-controlled value, performs vector control based on the generated current-controlled value and the current sensing value of the motor to generate a voltage-controlled value, and generates the torque-controlled signal based on the generated voltage-controlled value.

5. An elevator controlling device, comprising:
a control signal processing unit that receives a positional value of the motor every first cycle, calculates the speed of the motor every second cycle, and generates a control signal for controlling the motor every third cycle; and
a motor driving unit that controls the driving of the motor based on the control signal,
wherein the control signal processing unit includes a state feedback position controlling unit that outputs the torque-controlled value of the motor according to the calculated positional value and the rotational speed of the motor, and wherein the control signal processing unit outputs a control signal to the torque of the motor based on the torque-controlled value, and
wherein the state feedback position controlling unit takes a proportional and integral action on the difference between the position-controlled value and calculated positional value of the motor and outputs, as a torque-controlled value, subtraction of a value obtained by multiplying the rotational speed by a first constant and a value obtained by multiplying the positional value by a second constant, from a value obtained through the proportional and integral action.

6. The device according to claim 5, further comprising:
a motor;
a motor position measuring unit that calculates and transmits the positional value of the motor to the elevator controlling device;
a state feedback position controlling unit that receives the positional value of the motor every first cycle, receives the speed of the motor, and outputs a torque-controlled value to control the motor;
a state estimating unit that estimates the speed of the motor based on the torque-controlled value and the positional value every second cycle and transmits the result to the state feedback position controlling unit;
a vector controlling unit that generates a current-controlled value based on the torque-controlled value and outputs a voltage-controlled value according to the current-controlled value and the driving current of the motor; and
a motor driving unit that controls the driving power source of the motor according to the voltage-controlled value.

7. The device according to claim 5, further comprising:
a current sensor that senses the driving current of the motor; and
a vector controlling unit that outputs a voltage-controlled signal based on the current-controlled value and driving current of the motor received from the current sensor, and
wherein the state feedback position controlling unit generates and transmits a current-controlled value according to the torque-controlled value to the vector controlling unit.

8. The device according to claim 5, wherein the control signal processing unit includes a speed estimating unit that estimates the rotational speed of the motor according to the control signal and calculated positional value every second cycle.

9. The device according to claim 5, wherein the control signal processing unit acquires the speed of the motor measured from a motor speed measuring device.

* * * * *